July 17, 1956
F. H. BLANDING ET AL
2,755,231
STEAM TREATMENT OF REGENERATED CATALYSTS EMPLOYED
IN THE CONVERSION OF HYDROCARBONS
Filed Dec. 28, 1950
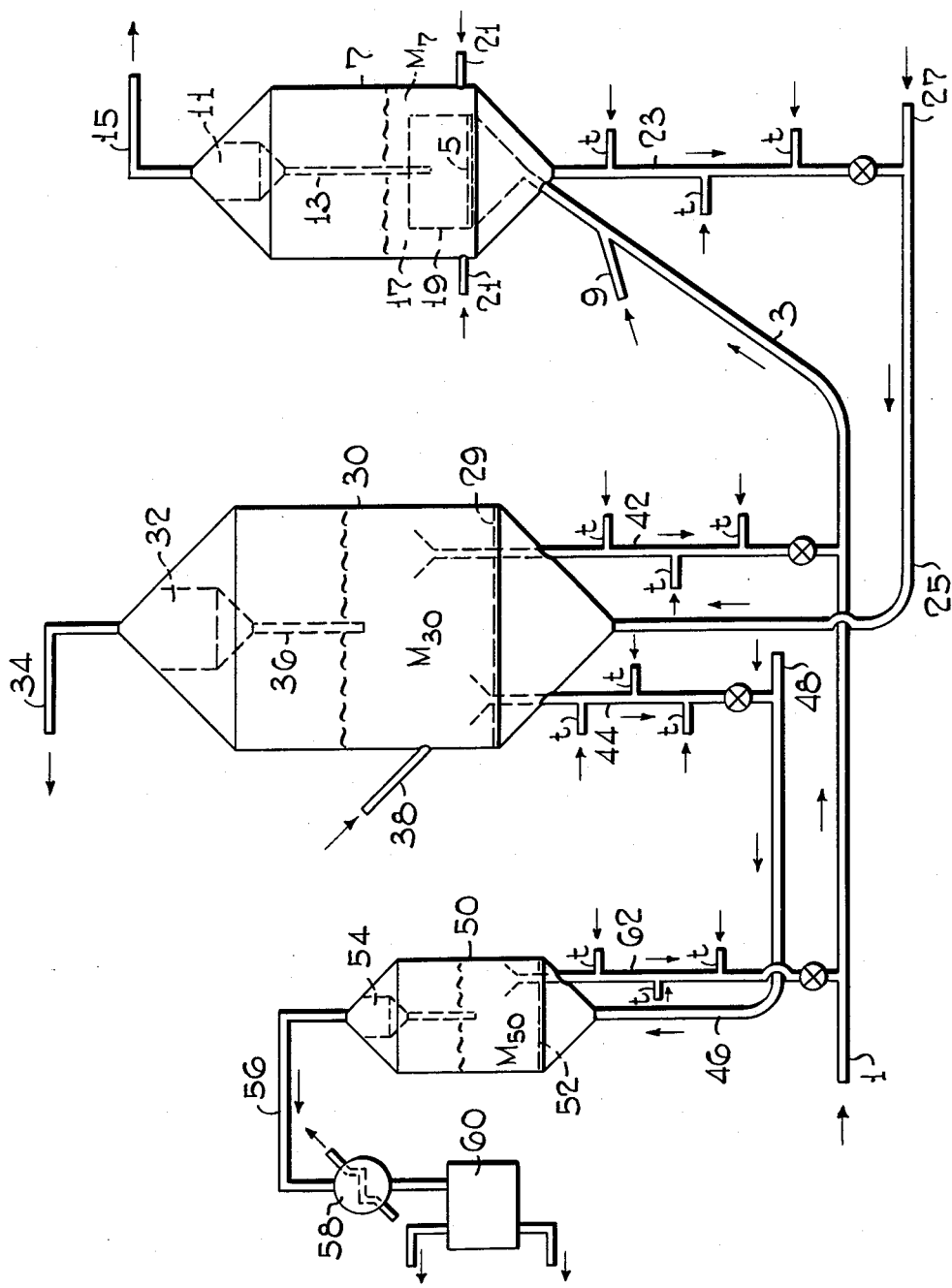
Forrest H. Blanding
Walter J. Schmidt, Jr. Inventors
By George J. Silhavy Attorney

United States Patent Office 2,755,231
Patented July 17, 1956

2,755,231

STEAM TREATMENT OF REGENERATED CATALYSTS EMPLOYED IN THE CONVERSION OF HYDROCARBONS

Forrest H. Blanding and Walter J. Schmidt, Jr., Cranford, N. J., assignors to Esso Research and Engineering Company, a corporation of Delaware Application December 28, 1950, Serial No. 203,142

3 Claims. (Cl. 196—52)

The present invention relates to the catalytic conversion of hydrocarbons. More particularly, the invention pertains to the continuous type of catalytic hydrocarbon cracking operations wherein a subdivided catalyst is circulated between a cracking zone and a regeneration zone, heat required for the cracking reaction being supplied as sensible heat of catalyst reheated in the regeneration zone by the combustion of carbonaceous catalyst deposits. In its broadest aspect the invention contemplates in continuous operations of the type specified the withdrawal of a sidestream of regenerated catalyst, treating this catalyst sidestream with steam at conditions adapted to improve the selectivity of the catalyst toward desired cracking products and returning the catalyst so treated to the main catalyst body circulating through the system.

In conventional processes for the catalytic cracking of hydrocarbon oils the feed stock, usually a gas oil, is contacted in the vapor state with a cracking catalyst at temperatures of about 800°–1000° F. and pressures ranging from subatmospheric to 50 p. s. i. g. or higher. Activated clays including acid treated bentonite, synthetic composite gel type catalysts, such as composites containing silica, alumina, and/or magnesia, with or without the addition of activating ingredients, such as boria, chromia, etc. have been used.

In the course of the cracking reaction, coke-like carbonaceous materials are deposited on the catalyst. These contaminating deposits seriously impair the activity of the catalyst. The contaminated catalyst is, therefore, regenerated by burning off carbonaceous deposits with an oxidizing gas such as air at temperatures of about 800°–1200° F. In the continuous type of operation here involved, the catalyst is circulated continuously between the reaction zone and a carbon burning regeneration zone for the purpose of catalyst regeneration and heat supply.

However, the catalyst also undergoes a second type of deactivation. It has been found that after a prolonged use the catalyst shows a marked decline in activity and particularly in selectivity toward the formation of gasoline range hydrocarbons over ultimate cracking products, such as carbon and gas. This deterioration of the catalyst must be remedied by procedures other than the combustion type of regeneration. The present invention refers to such a procedure.

Various methods for reviving catalysts deteriorated in this manner have been proposed heretofore. The most efficient methods of this type involve a treatment of the catalyst with certain chemicals particularly fluorine compounds, such as hydrogen fluoride, organic fluorides, etc. Aside from the considerable cost of the chemicals needed, these procedures are complicated by the fact that the addition of the chemicals must be carefully controlled to avoid damage to the catalyst by over-treatment and to afford uniform distribution of the treating agent on the catalyst particles. The present invention overcomes these disadvantages.

It is, therefore, the principal object of the invention to provide improved means for reactivating cracking catalysts which have been deteriorated in prolonged continuous operation involving circulation of catalyst between reaction and carbon-burning regeneration zones. A more specific object of the invention is continuously to maintain the gasoline selectivity of cracking catalysts used in this manner at a desirably high level. Other objects and advantages will appear from the subsequent description of the invention wherein reference will be made to the accompanying drawing, the single figure of which is a schematical illustration of a system suitable to carry out a preferred embodiment of the invention.

It has now been found that the gasoline selectivity of cracking catalysts and, more particularly, synthetic mixed gels, such as composites of silica gel with alumina and/or magnesia which tend to deteriorate with respect to gasoline selectivity after prolonged use in a system involving continuous catalyst circulation between reaction and carbon-burning regeneration zones may be maintained at a desirably high level by withdrawing a sidestream of catalyst regenerated by carbon combustion from the main catalyst body circulating in the system, subjecting the withdrawn catalyst to a treatment with steam at elevated temperatures preferably not exceeding the regeneration temperature, substantially atmospheric pressure and contact times of several hours and returning the catalyst so treated to the main body of circulating catalyst. It is well known in the art that steaming of conventional mixed gel type cracking catalysts detrimentally affects the surface area and thus the cracking activity of the catalyst as measured by percent total conversion or similar standards. However, it has been found that the improvement in gasoline selectivity afforded by the process of the invention when operated at suitable conditions so far out-weighs any reduction in catalyst activity that a substantial increase in gasoline yield is obtained. Conditions critical for this purpose are steam treating temperatures of about 1000° or 1050°–1200° F., pressures of about 0–25 p. s. i. g., and contact times of about 3–15 hours when using silica-alumina gel type catalysts. The proportion of catalyst subjected to the steam treatment of the invention may vary between about 5–35 wt. percent, preferably about 10–20 wt. percent, of the total catalyst inventory per day. It will be understood that the higher the proportion of catalyst so treated the less pronounced need be the improvement accomplished by the steam treatment for any desired substantially constant selectivity level of the main catalyst body. For example, relatively short treating times may be employed for the treatment of relatively high catalyst proportions and vice versa within the ranges specified. The amount of steam used for the steaming treatment should be sufficient to provide an atmosphere consisting predominantly of steam in the steam treating zone. However, larger amounts of steam may be used, if desired.

The process of the invention is applicable to all types of continuous cracking operations involving catalyst circulation between reaction and regeneration zones, such as fluid, moving bed or suspensoid systems. However, best results are consistently obtained when employing the so-called fluid catalyst technique which affords substantial advantages with respect to solids handling, heat transfer and completeness of gas-solids contacting. Therefore, the treatment in accordance with the invention of a catalyst sidestream withdrawn from the catalyst circulating in a fluid-type catalytic cracking system is the preferred embodiment of the invention.

In conventional fluid operation, hot regenerated powdered catalyst having an average particle size of about 50–80 microns is suspended in the vaporized feed stock and passed into the lower portion of a reactor through suitable distributing means. The velocity of the upflowing vapors in the reactor is such that the catalyst is maintained in a dense, turbulent, fluidized condition simulating a boiling liquid. Vapor velocities of about 0.5–3 ft. per second and bed densities of about 10–30 lbs. per cu. ft. are suitable for proper fluidization. Cracking conditions may include temperatures of 700°–1100° F. and pressures from atmospheric to about 25 p. s. i. g. Product vapors are withdrawn overhead. During the reaction a coke-like deposit is formed on the catalyst particles. The catalyst particles so fouled are withdrawn from the fluidized mass, stripped, suspended in air and passed to a regenerator similar in design to the reactor so that a similar fluidized mass forms in the regenerator. The temperature in the regenerator is somewhat higher than the cracking temperature, say about 1000°–1200° F. Coke-like deposits are burned in the regenerator and regenerated catalyst is returned from the dense bed to the oil charge and reactor as described above, preferably after suitable stripping. When employing the invention in combination with a system of this type, a third vessel similar in design to the reactor and regenerator is provided for the steam treatment. This steam treating vessel may be substantially smaller than the regenerator and normally need not be larger than about ⅕–¹⁄₁₀ the regenerator size. Catalyst is continuously or intermittently withdrawn from the regenerator in a sidestream and passed to the steam treating vessel wherein it is fluidized and treated with steam at the conditions of the invention. The fluidizing velocity may be maintained within the lower brackets of the range providing effective fluidization, say at about 0.05–0.3 ft. per second so as to minimize the quantity of steam required. Catalyst so treated may be returned to any part of the cracking system.

In all continuous operations of the type here specified but particularly in fluid operation, it is necessary to add to the system continuously or intermittently fresh make-up catalyst to replace catalyst fines lost through the gas-solids separation equipment and to maintain catalyst activity above a certain minimum level below which operation becomes inefficient. It is a well established fact that fresh cracking catalyst is much more sensitive to the above mentioned deactivating effect of steam treating while showing only very limited selectivity improvement as compared to catalyst which has been used for a certain length of time, say for about 50 hours or more. If the steam treatment of the invention is applied to relatively fresh catalyst, i. e. catalyst which has been used for substantially less than 50 hours, the reduction in catalyst activity due to steaming will compensate for so much of the improvement in selectivity as to affect appreciably the actual gasoline yields. This effect will be the more pronounced the lower the age of the catalyst and the higher the percentage of such relatively fresh catalyst so that in extreme cases the selectivity improvement may be wiped out completely or overcompensated by the drop in catalyst activity. In order to avoid this, the invention also provides for an application of the steam treatment essentially to catalyst which has been used for at least 50 hours. In practice, this may be accomplished by adding fresh catalyst in certain intervals and carrying out the steam treatment of the invention during intervals within which no fresh catalyst is being added to the system, so as to permit the fresh catalyst to become deactivated under conventional cracking unit conditions rather than by the steam treatment of the invention. For example, fresh catalyst may be added to the system for a period of 1–3 days followed by an aging period of about 2–3 days wherein no fresh catalyst is added. Thereafter the steam treatment of the invention may be employed for any desired period, say for about 1–15 days or longer without the addition of fresh catalyst. Then, fresh catalyst may again be added and this cycle may be repeated throughout the duration of the cracking run.

The beneficial effects of the steam treatment carried out at the conditions of the present invention are illustrated by the experimental data reported below. A synthetic silica-alumina gel-type catalyst containing about 13% $Al_2O_3$ was used in commercial fluid catalytic cracking at conventional conditions. A sample of the catalyst was taken from the circulating catalyst stream after a certain degree of deactivation was reached. Various samples of this catalyst were steam treated at elevated temperatures, various pressures and for various steaming times in a standard laboratory testing unit and the effect of these steam treatments on the activity and selectivity of the catalyst was determined after the different steaming times. The well established and generally accepted standards "Distillate+Loss $(D+L)$ and "Carbon Producing Factor" (CPF) were relied on to define catalyst activity and catalyst selectivity, respectively. The $D+L$ of a catalyst is determined by a test fully described in the literature (Conn and Connolly, Ind. Eng. Chem., vol. 39, page 1138 (1947)). Briefly, a standard feed stock is cracked on the test catalyst at standard conditions and 100 cc. of the liquid product is distilled in standard equipment. The amount of gasoline distilled at 400° F. is designated as "Distillate" or D, the residue or bottoms is B and the value $100-(D+B)$ is called loss or L. The sum of $D+L$ is a criterion for activity and may vary from about 10–30 for deactivated catalysts to about 30–50 for fresh cracking catalysts. The "Carbon Producing Factor" (CPF) is the ratio of the carbon produced by the test catalyst to that produced by an uncontaminated catalyst adjusted to the same activity by steam or heat treatment. It ranges from 1.0 for fresh catalyst to 1.5–2.0 or more for used catalyst. From the data obtained, the ratio R of the reduction in CPF effected by steaming over the reduction in $D+L$ effected by the same treatment was calculated. This ratio R is an indication of the relative rates of improvement in selectivity per unit of $D+L$ deactivation obtained. In other words, this ratio R is a criterion of the amount of useful improvement in actual gasoline yield obtained per unit of reactor space required. In further explanation of this relationship, it is noted that if a given improvement in CPF is obtained in two different steaming operations, one of which causes a large reduction in $D+L$ and thus a low value of R, the other one causing a small reduction in $D+L$ and thus a high value of R, it will be found that the operation involving the small reduction in $D+L$ will be highly advantageous. This is true because much less catalyst will be required in the reactor when using the high $D+L$ catalyst. It follows that the higher the ratio R the more desirable the steaming operation. The conditions and results of the experiments just referred to are summarized in Table I below.

TABLE I

| Treating Temp., °F. | Treating Pressure, p. s. i. g. | Treating Time, Hours | Activity, $D+L$ | Selectivity, CPF | $\Delta$ $D+L$ | $\Delta$ CPF | R |
|---|---|---|---|---|---|---|---|
| Start | | | 27.0 | 1.46 | | | |
| 1,050 | 140 | 8 | 21.2 | 1.25 | 5.8 | 0.21 | 0.036 |
| 1,100 | 140 | 15 | 11.0 | 1.18 | 16.0 | 0.28 | 0.018 |
| 1,150 | 0 | 168 | 24.6 | 1.16 | 2.4 | 0.30 | 0.13 |
| 1,150 | 0 | 336 | 24.4 | 1.15 | 2.6 | 0.31 | 0.12 |

The data reported in Table I show that a substantial reduction in CPF, i. e. a substantial selectivity improvement is obtained by all steam treatments listed. On the other hand, it will be noted that pronounced reductions in $D+L$ took place when operating at elevated pressures of 140 p. s. i. g. In order to obtain a comparable degree of selectivity (CPF) improvement at atmospheric pressure, it was necessary to employ longer times and somewhat higher temperatures. However, it is evident that steaming at atmospheric pressure resulted in much less reduction in $D+L$ and higher values of R. This shows that the lower pressures used are highly advantageous for the purposes of the invention. It will be noted that increasing the time from 168 hours to 336 hours at the same pressure had no appreciable further effect on selectivity improvement. Similar experiments indicate that very substantial proportions of the selectivity improvement obtained in 168 hours is obtained after a steaming time of only 3–15 hours at 1100°–1200° F.

To illustrate the effect of catalyst selectivity as expressed in terms of CPF on actual process yields, the figures given in Table II below may be referred to. In this table, yield figures obtained at different CPF but otherwise comparable conditions are listed.

TABLE II

| CPF | 1.7 | 1.4 | 1.2 |
|---|---|---|---|
| Conversion, percent | 60 | 60 | 60 |
| Gas, wt. percent | 6.8 | 6.3 | 6.0 |
| $C_4$, vol. percent | 9.0 | 9.2 | 9.3 |
| $C_5$—430° F., vol. percent | 48.0 | 50.5 | 51.7 |
| Carbon, wt. percent | 6.3 | 5.3 | 4.8 |

It will be noted that the yield of gasoline increases from 48.0% to 51.7% as CPF decreases from 1.7 to 1.2. This increase in gasoline yield represents an important improvement in commercial scale refining practice. It will also be noted that as CPF is improved from 1.7 to 1.2, carbon actually formed drops off from 6.3% to 4.8%. The carbon formed in catalytic cracking is highly detrimental; in fact most of the cost of a fluid catalytic cracking unit is involved in the carbon burning facilities of the system. Thus, the reduction in carbon formation allows important savings in investment for a commercial unit.

In existing systems, the capacity of the unit is usually limited by its carbon-burning capacity. An improvement in catalyst selectivity (CPF) will, therefore, allow more oil to be cracked per unit of existing carbon burning capacity and thus a higher coversion of feed stock can be achieved. In Table III below, yields are shown which were obtained in an existing commercial catalytic cracking unit as a function of CPF wherein conversion is increased to the maximum possible at the existing carbon burning capacity.

TABLE III

| CPF | 1.7 | 1.4 | 1.2 |
|---|---|---|---|
| Conversion, percent | 55.7 | 59.1 | 60.6 |
| Gas, wt. percent | 6.1 | 6.1 | 6.1 |
| $C_4$, vol. percent | 7.8 | 8.9 | 9.5 |
| $C_5$—430° F., vol. percent | 46.3 | 50.0 | 52.0 |
| Carbon, wt. percent | 5 | 5 | 5 |

It will be noted that in this case a larger increase in gasoline yield (from 46.3% to 52.0%) is obtained than is shown in Table II.

Having set forth its objects and general nature, the invention will be best understood from the more detailed description given below with reference to the drawing. Referring now in detail to the drawing, the system illustrated essentially comprises a fluid-type catalytic cracking reactor 7, a regenerator 30 of similar design and a steam treater 50. The function and coaction of these elements will be forthwith described.

In operation, a gas oil boiling within the range of about 500°–1000° F. may be supplied to the system via line 1 at a preheating temperature of about 500°–800° F. The oil feed is discharged into line 3 carrying hot regenerated subdivided catalyst, such as a synthetic silica-alumina gel, having a temperature of about 1000°–1100° F. The catalyst oil mixture now at a proper cracking temperature of about 900°–1000° F. and containing about 3–10 lbs. of catalyst per lb. of oil fed to line 3 is introduced through a distributing device such as grid 5 into reactor 7 to form therein a relatively dense turbulent mass $M_7$ of solids above grid 5, fluidized by the reacting hydrocarbon vapors and, if desired, by additional steam added via line 9. At an average catalyst particle size of about 40–80 microns, reactor 7 may be designed for a superficial linear gas velocity of about 0.5–1.5 ft. per second and an apparent density of $M_7$ of about 20–40 lbs. per cu. ft. Cracked oil vapors and entrained catalyst fines leave reactor 7 through gas-solids separation means, such as cyclone separator 11, from which separated solids may be returned to mass $M_7$ via dip pipe 13. The product vapors may be passed through line 15 to conventional fractionating and recovering means (not shown).

The coke-carrying used catalyst may be permitted to settle into an annular space 17 formed in reactor 7 between the reactor walls and a concentric baffle 19 to serve as a stripping space. Small amounts of an inert gas, such as steam, flue gas, etc., may be admitted through two or more lines 21 for stripping and to maintain by aeration the catalyst in space 17 in a readily flowing state. The catalyst may be withdrawn from space 17 via a conventional standpipe 23 aerated with steam or the like through one or more taps $t$. The catalyst withdrawal is substantially at the rate at which catalyst is supplied to reactor 7 via line 3. Standpipe 23 discharges into line 25 wherein the catalyst is suspended in air supplied from line 27. The suspension is passed via grid 29 to regenerator 30 to form therein a fluidized mass $M_{30}$ similar to mass $M_7$. Carbonaceous deposits are burned off the catalyst in regenerator 30 at temperatures of about 1000°–1200° F. Flue gases leave regenerator 30 through separator 32 and line 34, separated fines being returned to mass $M_{30}$ via dip pipe 36. Fresh make up catalyst may be added through line 38. Hot regenerated catalyst is withdrawn from mass $M_{30}$ through standpipe 42, stripped and aerated through one or more taps $t$, and returned via line 3 as previously described. The process described up to this point is substantially conventional. Many procedural details which may be readily supplied by those skilled in the art have, therefore, been omitted for the sake of brevity.

After the system has been operated for a certain length of time in the manner described, the selectivity of the catalyst will have deteriorated from a CPF value of 1 for the fresh catalyst to a CPF value approaching or exceeding 2 causing the operating efficiency to drop off sharply. At this or any desired earlier time the steam treatment in accordance with the invention is employed. For this purpose, a catalyst sidestream amounting to about 5–35% of the total catalyst inventory per day is continuously withdrawn from regenerator 30 through a conventional standpipe 44 aerated through taps $t$. The catalyst is passed to line 46 and suspended therein in steam supplied via line 48 at a temperature of about 1000°–1250° F. The suspension enters treater 50 via grid 52 substantially at the temperature of mass $M_{30}$ and forms above grid 52 a dense turbulent mass $M_{50}$.

Treater 50 may be of substantially smaller size than regenerator 30, exact dimensions depending on the proportion of the catalyst inventory to be treated therein. The design of treater 50 should be suitable for a catalyst hold-up permitting a residence time of 3–15 hours and complete steam-catalyst contacting in the dense fluid phase. This may be best accomplished by giving treater 50 an elongated shape having a length:diameter ratio ($L/D$) between about 5 and 15, while using relatively low superficial linear steam velocities in mass $M_{50}$ of not substantially more than 0.3 ft. per second. At these conditions, mass $M_{50}$ may be readily maintained at substantially atmospheric pressure and temperatures of about 1000°–1150° F. which have been found conducive to the desired selectivity improvement.

Steam containing entrained catalyst is passed through gas-solids separation equipment 54 to be withdrawn via line 56. If desired, this steam may be condensed in condenser 58 so as to form a water slurry of catalyst fines in settler 60 from which catalyst fines may be recovered for reuse. Steam-treated fluidized catalyst is withdrawn downwardly from mass $M_{50}$ through conventional standpipe 62 substantially at the rate at which catalyst is supplied to treater 50 via line 46. From standpipe 62 the steam-treated catalyst of improved selectivity may be returned to any part of the main cracking unit to improve the overall selectivity of the total catalyst inventory. The drawing shows the return of the steam-treated catalyst via line 3 to reactor 7. In this manner, the improved selectivity of the catalyst is immediately utilized in the cracking reaction while avoiding any undesirable or superfluous dilution of mass $M_{30}$ with decarbonized solids.

The system illustrated permits of various modifications. For example, the steam-treated catalyst may be returned wholly or in part to regenerator 30, particularly if the presence of low-carbon solids in regenerator 30 is considered desirable for a control of the combustion reaction and/or regeneration temperature. Steam may be supplied to treater 50 at a substantially lower preheating temperature than that specified. In this case, a small amount of air may be injected into treater 50 to maintain desirable treating temperatures therein by a limited combustion of catalyst carbon. Other modifications within the spirit of the invention may appear to those skilled in the art.

The invention will be further illustrated by the following specific example.

*Example*

In an operation of the type described with reference to the drawing, a commercial unit having a total catalyst inventory of 400 tons is used. A catalyst sidestream of 50 tons per day is withdrawn from regenerator 30 operating at 1150° F. This catalyst is passed to the stream treater 50 designed to maintain 21 tons of fluidized catalyst. This vessel has a relatively high $L/D$ of 10. The average treating time in vessel 50 is 10 hours. Before starting this treatment the catalyst inventory has a CPF of 1.70. Immediately upon starting operation in treater 50 the CPF commences to fall and reaches an equilibrium value of 1.4 CPF after about 12-15 days of treater operation. Thereafter treater operation may be interrupted, if desired, during which interruption fresh makeup catalyst may be added as required. Thereafter, another steam treatment may be carried out as just described.

The above description and exemplary operations have served to illustrate specific embodiments of the invention but are not intended to be limiting in scope.

What is claimed is:

1. In a process for the catalytic cracking of gas oil to form gasoline range hydrocarbons wherein a subdivided synthetic silica-alumina cracking catalyst of fluidizable particle size is circulated in a system comprising a crackng zone in which said gas oil is cracked at a cracking temperature in contact with a dense, turbulent, fluidized mass of said catalyst resembling a boiling liquid with concomitant deposition of combustible carbonaceous deposits on the catalyst and a catalyst regeneration zone in which the catalyst is regenerated at a temperature of about 1000°–1200° F. by burning combustible carbonaceous deposits off said catalyst while in the form of a dense, turbulent, fluidized mass resembling a boiling liquid and wherein the selectivity of said catalyst toward the formation of gasoline range hydrocarbons is reduced in the course of said process by effects other than said deposits, by first circulating highly selective cracking catalyst through said cracking zone and through said regeneration zone a number of times until the selectivity of the circulating catalyst is substantially reduced, the improvement which comprises thereafter withdrawing at intervals a separate stream of catalyst of reduced gasoline selectivity from said regeneration zone, said stream amounting to about 5-35 wt. percent of the total catalyst inventory of said system per day and consisting essentially of catalyst circulated in said system for at least 50 hours prior to its withdrawal in said separate stream, treating said withdrawn catalyst substantially continuously with steam in a treating zone in the form of a dense, turbulent, fluidized mass resembling a boiling liquid at a temperature of about 1050°–1200° F., substantially atmospheric pressure and at a steam contacting time of about 3–15 hours to increase the selectivity of said withdrawn catalyst, a sufficient amount of steam being used to provide an atmosphere consisting predominantly of steam in said treating zone, minimizing the quantity of steam used by using a low superficial velocity of steam, returning catalyst so treated to said cracking zone, controlling the rate of said catalyst withdrawal from said regeneration zone and catalyst return to said cracking zone so as to increase the gasoline selectivity of said circulating catalyst and carrying out the steam treating cycle which comprises catalyst withdrawal, steam treatment and catalyst return for an interval lasting at least about 1–15 days, and adding fresh catalyst to the process to replace catalyst lost from the system at intervals other than those when the steam treating cycle is in operation.

2. The process of claim 1 in which said fluidized mass in said treating zone is maintained in a fluidized condition by said steam at a fluidizing superficial velocity of about 0.05–0.3 ft. per second, said treating zone having a ratio of height to width of about 5–15.

3. In a process for the catalytic cracking of gas oil to form gasoline range hydrocarbons wherein a subdivided synthetic silica-alumina cracking catalyst of fluidizable particle size is circulated in a system comprising a cracking zone in which said gas oil is cracked at a cracking temperature in contact with a dense, turbulent, fluidized mass of said catalyst resembling a boiling liquid with concomitant deposition of combustible carbonaceous deposits on the catalyst and a catalyst regeneration zone in which the catalyst is regenerated at a temperature of about 1000°–1200° F. by burning combustible carbonaceous deposits off said catalyst while in the form of a dense, turbulent, fluidized mass resembling a boiling liquid and wherein the selectivity of said catalyst toward the formation of gasoline range hydrocarbons is reduced in the course of said process by effects other than said deposits, by first circulating highly selective cracking catalyst through said cracking zone and through said regeneration zone a number of times until the selectivity of the circulating catalyst is substantially reduced, the improvement which comprises thereafter withdrawing at selected intervals a separate stream of catalyst of reduced gasoline selectivity from said regeneration zone, said stream consisting essentially of catalyst circulated in said system for at least 50 hours prior to its withdrawal in said separate stream, treating said withdrawn catalyst substantially continuously with steam in a treating zone in the form of a dense, turbulent, fluidized mass resembling a boiling liquid at a temperature of about 1050°–1200° F., substantially atmospheric pressure and at a steam contacting time of about 3–15 hours to increase the selectivity of said withdrawn catalyst, a sufficient amount of steam being used to provide an atmosphere consisting predominantly of steam in said treating zone, returning catalyst so treated to said cracking zone so as to increase the gasoline selectivity of said circulating catalyst and carrying out the steam treating cycle which comprises catalyst withdrawal, steam treatment and catalyst return for an interval lasting at least about 1–15 days, and adding no fresh catalyst to the process to replace catalyst lost from the system when the steam treating cycle is in operation.

References Cited in the file of this patent

UNITED STATES PATENTS

| | | |
|---|---|---|
| 2,414,736 | Gray | Jan. 21, 1947 |
| 2,495,723 | Hormann | Jan. 31, 1950 |
| 2,526,701 | Shirk | Oct. 24, 1950 |
| 2,539,583 | Kuhn | Jan. 30, 1951 |
| 2,631,123 | Kaulakis | Mar. 10, 1953 |